S. A. VASEY.
POWDERED-MILK PRODUCT.
APPLICATION FILED MAR. 25, 1916.
1,202,130.
Patented Oct. 24, 1916.
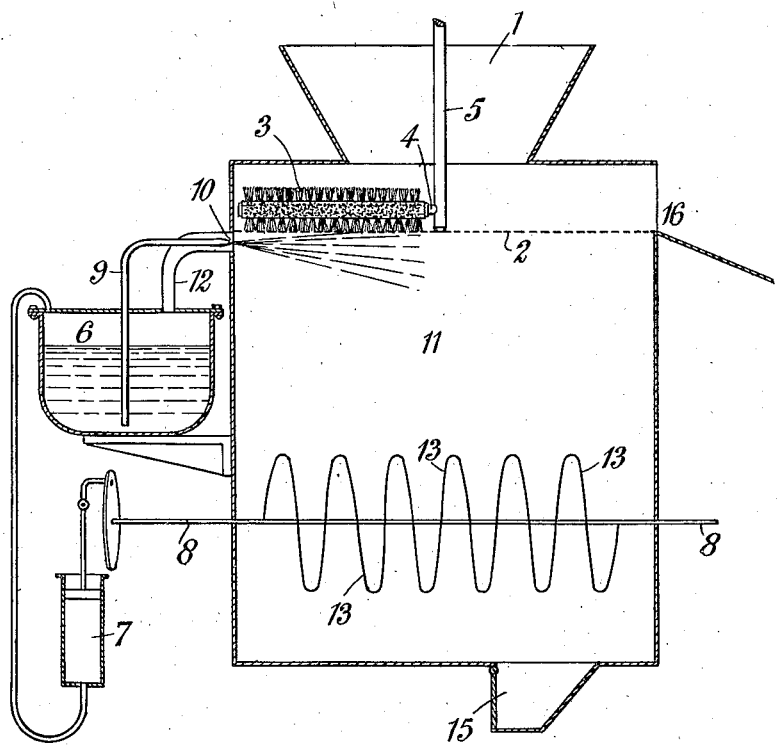
Inventor
Samuel A. Vasey
By his Attorneys
Baldwin & Wight

UNITED STATES PATENT OFFICE.

SAMUEL ARCHIBALD VASEY, OF LONDON, ENGLAND.

POWDERED-MILK PRODUCT.

1,202,130.                    Specification of Letters Patent.    Patented Oct. 24, 1916.

Application filed March 25, 1916. Serial No. 86,584.

*To all whom it may concern:*

Be it known that I, SAMUEL ARCHIBALD VASEY, a subject of the King of Great Britain, residing at 423 Strand, London, England, have invented new and useful Improved Powdered-Milk Products, of which the following is a specification.

This invention relates to improved powdered milk products and has for its object to increase their keeping qualities and also to keep the powder from caking.

According to this invention the particles of a milk or cream powder are intimately mixed or coated with a small quantity of an odorless hydrocarbon which at ordinary temperatures is both liquid and non-volatile.

The improved powder may be produced by projecting a milk or cream powder with, for example, an air blast into a mist of an odorless hydrocarbon of the class described, such as petroleum (paraffinum liquidum), the mist being produced by atomizing the hydrocarbon by a spray producer at ordinary temperatures.

From one to three per cent. of hydrocarbon is usually sufficient for the purpose and I wish it to be understood that I do not claim a powder to which more than five per cent. has been added.

The accompanying diagrammatic drawing illustrates the invention.

Powder is fed through a hopper 1 and falls on to a perforated sieve 2 and is forced through the sieve holes by a roller brush 3 free to rotate on a spindle 4 carried by a shaft 5 rotated in any convenient manner not shown.

The hydrocarbon is contained in a closed vessel 6 into which air is forced by a pump 7 driven by a shaft 8, itself revolved in any convenient manner not shown.

The air pressure delivers oil by the pipe 9 out through the orifice 10 into the chamber 11 below the sieve 2, while air under pressure passes into a pipe 12 which surrounds the orifice 10. The powder therefore falls through a mist of hydrocarbon and on to revolving mixing blades 13 carried by the shaft 8.

The finished product is removed from time to time through the door 15, while coarse powder which does not pass through the sieve 2 passes away at 16.

A little experience will easily determine the rate of feed of the hydrocarbon and the powder.

The improved powdered products are not altered in appearance from the original powdered milk products, but are differentiated therefrom by their keeping and non-caking qualities, but while the untreated powder has a gritty feel, a treated powder is smooth and soft to the touch although there is no increase in moisture; the hydrocarbon does not separate from the milk product when dissolved in water, but the presence of the hydrocarbon can be ascertained by analysis.

In my companion application No. 86,583, filed March 25, 1916, I have claimed the process herein described. The claim in the application for this patent is directed to an article manufacture.

What I claim is:—

As a new article of manufacture, a powdered milk product whose particles are intimately mixed or coated with not more than five per cent. of an odorless hydrocarbon which is liquid and non-volatile at ordinary temperatures.

SAMUEL ARCHIBALD VASEY.